US009747368B1

(12) United States Patent
Heitz, III et al.

(10) Patent No.: US 9,747,368 B1
(45) Date of Patent: Aug. 29, 2017

(54) BATCH RECONCILIATION OF MUSIC COLLECTIONS

(71) Applicant: Google Inc., Mountain View, CA (US)

(72) Inventors: George Alban Heitz, III, Mountain View, CA (US); Yang Lu, San Jose, CA (US)

(73) Assignee: Google Inc., Mountain View, CA (US)

( * ) Notice: Subject to any disclaimer, the term of this patent is extended or adjusted under 35 U.S.C. 154(b) by 300 days.

(21) Appl. No.: 14/097,544

(22) Filed: Dec. 5, 2013

(51) Int. Cl.
 *G06F 7/00* (2006.01)
 *G06F 17/00* (2006.01)
 *G06F 17/30* (2006.01)

(52) U.S. Cl.
 CPC .. *G06F 17/30743* (2013.01); *G06F 17/30156* (2013.01)

(58) Field of Classification Search
 CPC ......... G06F 17/30017; G06F 17/30386; G06F 17/30758; G06F 17/30029; G06F 17/30091; G06F 17/3084; G06F 17/30489; Y10S 707/913; G06K 9/00751; G06K 9/00758
 See application file for complete search history.

(56) References Cited

U.S. PATENT DOCUMENTS

| | | | |
|---|---|---|---|
| 7,176,794 B2 * | 2/2007 | Fairhurst ................ | H04N 7/002 340/566 |
| 8,266,115 B1 * | 9/2012 | Park ............................ | 707/692 |
| 8,953,811 B1 * | 2/2015 | Sharifi ................... | H04H 60/37 381/56 |
| 2003/0086341 A1 * | 5/2003 | Wells ................ | G06F 17/30017 369/13.56 |
| 2003/0172079 A1 * | 9/2003 | Millikan ............... | G11B 27/034 |
| 2004/0078293 A1 * | 4/2004 | Iverson .................. | G06Q 30/02 705/26.41 |
| 2004/0193570 A1 * | 9/2004 | Yaeger .............. | G06F 17/30489 |
| 2005/0021653 A1 * | 1/2005 | Song ................. | G06F 17/30828 709/207 |
| 2005/0044561 A1 * | 2/2005 | McDonald ............. | H04H 60/58 725/18 |
| 2005/0091275 A1 * | 4/2005 | Burges .............. | G06F 17/30017 |
| 2006/0095465 A1 * | 5/2006 | Millikan ............... | G11B 27/034 |
| 2007/0123185 A1 * | 5/2007 | Welk .................... | G11B 27/031 455/166.2 |

(Continued)

FOREIGN PATENT DOCUMENTS

EP 1526530 A2 * 4/2005 ....... G06F 17/30017

*Primary Examiner* — Augustine K Obisesan
(74) *Attorney, Agent, or Firm* — Morris & Kamlay LLP

(57) ABSTRACT

A system and method for reducing duplication of music tracks associated with a user account of an online music provider, includes selecting multiple music collections. Selecting at least one of the tracks in the selected music collections, identifying multiple duplicate metadata candidate tracks and multiple duplicate audio candidate tracks. The duplicate metadata candidate tracks are compared to the duplicate audio candidate tracks to identify common duplicate tracks. An audio hash is calculated for each audio file for the common duplicate tracks. An audio hash of one of the common duplicate tracks is selected and compared to the remaining audio hashes of the common duplicate tracks to identify matching tracks. All instances of the matching track in the selected music collections can be replaced with the selected track.

15 Claims, 13 Drawing Sheets

(56) References Cited

U.S. PATENT DOCUMENTS

| | | | |
|---|---|---|---|
| 2008/0059991 A1* | 3/2008 | Romano | G06F 17/30802 725/19 |
| 2008/0183719 A1* | 7/2008 | Kageyama | G06F 17/3089 |
| 2010/0198797 A1* | 8/2010 | Wideman | G06F 17/30156 707/692 |
| 2010/0211612 A1* | 8/2010 | Afaneh | G11B 27/034 707/803 |
| 2011/0218983 A1* | 9/2011 | Chaney | G06F 17/30752 707/705 |
| 2011/0307457 A1* | 12/2011 | Ishii | G06F 17/30283 707/692 |
| 2012/0310762 A1* | 12/2012 | Robbin | G06F 21/10 705/26.1 |
| 2013/0003986 A1* | 1/2013 | Munch | H04H 60/65 381/80 |
| 2013/0132078 A1* | 5/2013 | Arakawa | G10L 25/78 704/233 |
| 2014/0143212 A1* | 5/2014 | Shumay | G06F 17/30035 707/692 |
| 2014/0244600 A1* | 8/2014 | Schmidt | G06F 17/30156 707/692 |

* cited by examiner

500

| TK 3  |
| AF3   M3 |
| TK 3' |
| AF3   M3' |

| TK 4  |
| AF4   M4 |
| TK 4' |
| AF4'  M4' |

| TK 5  |
| AF5   M5 |
| TK 5' |
| AF5   M5' |
| TK 5" |
| AF5'  M5 |
| TK 5'" |
| AF5"  M5 |
| TK 5"" |
| AF5'"  M5'" |
| TK 5""' |
| AF5   M5" |

| TK 7  |
| AF7   M7 |
| TK 7' |
| AF7'  M7 |
| TK7"  |
| AF7"  M7 |

| TK 3 |
| AF3   M3 |

| TK 4 |
| AF4   M4 |

| TK 5 |
| AF5   M5 |
| TK 5A |
| AF5A  M5A |

| TK 7 |
| AF7   M7 |

FIG. 5B

BATCH RECONCILIATION OF MUSIC COLLECTIONS

BACKGROUND

The disclosed embodiments relate generally to music collections.

Users typically store their music data files e.g., tracks, in their online music collection storage such as storage on a cloud server. The users' music collections often become cumbersome due, in part, to including duplicated tracks. Reconciling a selected user's music collection can identify the duplicated tracks. The identified duplicated tracks can be removed without reducing the quality and content of the selected music collection. A portion of the duplicated tracks are stored in the selected music collection due incomplete or incorrect metadata for the respective tracks. The incomplete and/or incorrect metadata often prevents typical reconciling or matching processes from accurately identifying duplicated tracks. Further, as many users will have similar music collections, individually reviewing each users' music collection would involve excess duplication of the reconciliation process itself.

SUMMARY

Broadly speaking, a system and method for efficiently reconciling multiple music collections is disclosed. It should be appreciated that the present disclosure can be implemented in numerous ways, including as a process, an apparatus, a system, computer readable media, or a device. Several inventive embodiments of the present disclosure are described below.

One embodiment provides a method for reducing duplication of music tracks associated with a user account of an online music provider and includes selecting multiple music collections for analysis. One or more of the tracks in the selected music collections is selected for comparison purposes and multiple duplicate metadata candidate tracks and multiple duplicate audio candidate tracks are identified. The duplicate metadata candidate tracks are compared to the duplicate audio candidate tracks to identify common duplicate tracks. An audio hash is calculated for each audio file for the common duplicate tracks. An audio hash of one of the common duplicate tracks is selected and compared to the remaining audio hashes of the common duplicate tracks to identify matching tracks. All instances of the matching track in the selected music collections can be replaced with the selected track.

Matching a track in one or more collections to a corresponding master repository track allows offering one or more suggestions of additional/complete metadata to the user and/or collection, offer alternative track recommendations based on the corresponding master repository track, access to an improved or higher audio quality version of the track, and provide the user and/or collection with the corresponding album art or other information about the corresponding albums/tracks including descriptions, details, artist art, etc.

Another embodiment provides a system for reducing duplication of music tracks associated with a user account of an online music provider, includes a memory and a processor, the processor configured to execute program instructions for selecting multiple music collections. One of the tracks in the selected music collections is selected for comparison purposes, multiple duplicate metadata candidate tracks and multiple duplicate audio candidate tracks are identified. The duplicate metadata candidate tracks are compared to the duplicate audio candidate tracks to identify common duplicate tracks. An audio hash is calculated for each audio file for the common duplicate tracks. An audio hash of one of the common duplicate tracks is selected and compared to the remaining audio hashes of the common duplicate tracks to identify matching tracks. All instances of the matching track in the selected music collections can be replaced with the selected track.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The present disclosure will be readily understood by the following detailed description in conjunction with the accompanying drawings.

FIG. 5A is a listing of the duplicate track candidates extracted from the locker service, for implementing embodiments of the present disclosure.

FIG. 5B is a listing of the de-duped duplicate track candidates extracted from the locker service, for implementing embodiments of the present disclosure.

DETAILED DESCRIPTION

Figure 1A:
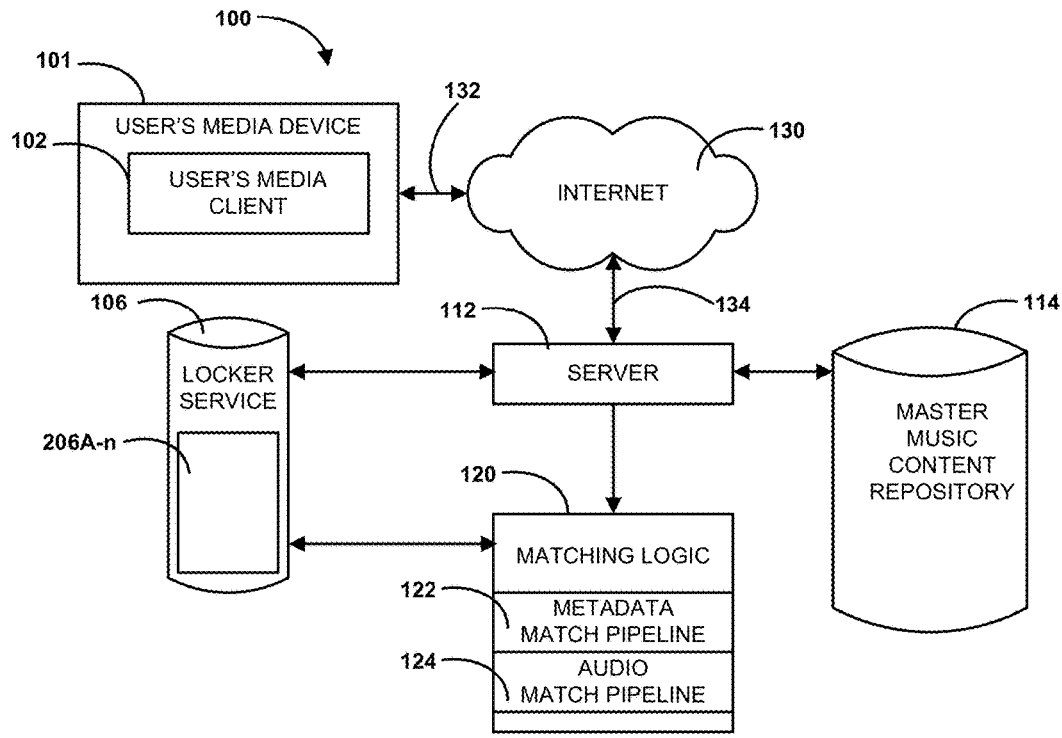
FIG. 1A is a simplified block diagram of a music data file, online storage system, for implementing embodiments of the present disclosure.

Several example embodiments for systems and methods for efficiently reconciling multiple music collections is disclosed will now be described. It will be apparent to those skilled in the art that the present disclosure may be practiced without some or all of the specific details set forth herein.

Identifying duplicate music tracks, e.g., data files containing the music content, can eliminate duplication and reduce the demands on the servers of an online music content provider service. Eliminating duplication of stored content such as data files containing the music content also allows the servers to respond to requests for content and serve the data files containing the requested music content more efficiently and more quickly and thereby enhance the end user's experience with the online music content provider service.

Matching a track in one or more collections to a corresponding master repository track allows offering one or more suggestions of additional/complete metadata to the user and/or collection, offer alternative track recommendations based on the corresponding master repository track, access to an improved or higher audio quality version of the track, and provide the user and/or collection with the corresponding album art or other information about the corresponding albums/tracks including descriptions, details, artist art, etc.

In one implementation, a multiple parallel pipeline capable of processing multiple parallel processes can be used to simultaneously match many users' music collections against a selected music data file database. The multiple parallel pipeline can share information between the multiple tracks stored in multiple users' music collections, to allow a more accurate matching of all users' tracks.

For example, the processing pipeline can include a beginning phase that scans all of the tracks stored in all of the selected users' music collections. Each of the scanned users' music collections can be "de-duped" as compared to the other users' music collections using selected metrics for determining that two user's tracks are identical from one or both of a metadata or an audio perspective. As used herein, the term "de-dupe" refers to removing duplicates or identifying duplicate files and removing the duplicate or eliminating pointers or references to duplicates.

In some implementations, de-duping all of the selected users' music collections may yields an approximate 12.3× compression, or more, of the overall data processing required. The tracks having unique audio can be processed in a first portion of the pipeline referred to as an audio matcher. The tracks having unique metadata can be processed in a second portion of the pipeline referred to as a metadata matcher.

In one implementation, multiple different tracks can be selected in a batch. The selected batch of tracks can be selected based on matching tokens. By way of example, many different tracks can be included in a single batch for comparison and analysis. Each parallel mapper pipeline can process a different batch of tracks that may contain matches.

The audio matcher processes an audio database to generate acoustic features and indexes of the tracks included in the database. A series of mapreduces group the query and the audio entries based on an audio index and compute matching score of each unique query audio and the audio pair from the tracks in the database. The audio index is highly efficient and can produce a small number of audio match candidates for a pairwise audio match scoring while also maintaining a high match rate.

The metadata matcher processes the metadata of the tracks stored in the database to produce a table-based "index" of the database. The mapreduce framework can "lookup" the indexed metadata entries and compute a matching metadata match score for each unique query metadata.

In one implementation, the resulting metadata candidates can be pruned based on the index to produce a smaller number of metadata match candidates from the database. The smaller number of metadata match candidates can be efficiently scored against the query metadata using a metadata scoring algorithm as described in more detail below.

The audio match candidates output from the audio matcher and the metadata match candidates output from the metadata matcher are combined to produce a set of best matches for each deduped track. The best matches are then projected out onto the originally stored tracks in each of the music collections.

Using the processes described herein, one implementation was capable of comparing 5,570,383,783 (5.6 billion) locker tracks to identify 634,503,548 unique tracks thus providing an effective compression ratio of about 11.3%. For comparison purposes, an example master repository is about 30 million tracks. Thus, reducing the storage demands of the locker tracks has the potential to provide vast reductions in storage and server demands.

FIG. 1A is a simplified block diagram of a music data file, online storage system 100, for implementing embodiments of the present disclosure. The online storage system 100 includes a users music content client 102 and the users' music collections 206A-n are stored in a locker service 106. As used herein a locker service is a storage service that enables storage of user data, such as music data files, audio files, tracks, songs, albums, etc. In one implementation, a locker service can receive data, such as audio files, from users, e.g., uploads, or can serve or download data already stored within a user's locker service account.

In one implementation, the user's music content client 102 is linked, via one or more wired or wireless networks such as a cellular or other wireless network 132, the Internet 130 and other networks 134, to an online music content provider server 112. A locker service 106 is typically included in a user's account in the online music content provider server 112. The online music content provider server 112 can also include or otherwise be linked to a master music content repository 114.

The music track, online storage system 100 can also include matching logic 120. The matching logic 120 can include a metadata matching pipeline 122 and an audio matching pipeline 124. Each of the metadata matching pipeline 122 and the audio matching pipeline 124 can sequentially or simultaneously compare multiple metadata files and audio files, respectively.

The user's music content client 102 can be on several different devices such as a computer, a tablet, a smart phone or other Internet enabled device. In one example, a user's music content client 102 can be simplified to display data presented on the user's device 101 with a all application functionality being provided by one or more servers coupled to the music content client. Alternatively, the user's music content client 102 can include one or more applications for uploading, accessing, sorting, analyzing, etc., the music content stored on the servers.

The display data presented on the user's content client 102 can include logical links, such as hyperlinks and similar logical mapping links and pointers, to applications and content that can produce the desired function. The functional applications can be hosted on the user's device 101 or on an online music provider's server 112 or combinations thereof. Example functions include functions to select music content for playback, purchase, and/or upload to the user's music collection 206A-n.

Further, to the above, the locker service 106 can include an online storage medium for storing multiple users' music collections 206A-n. Users often purchase new music tracks from sources such as the online music provider or another source such as a compact disc or another online music provider. Once the user has possession of the new music track, the user may wish to store the new music track in the respective user's music collection 206A-n. The user can then access the new music track from the respective user's music collection 206A-n such as to download or stream the track via user's music content client 102.

Figure 1B:
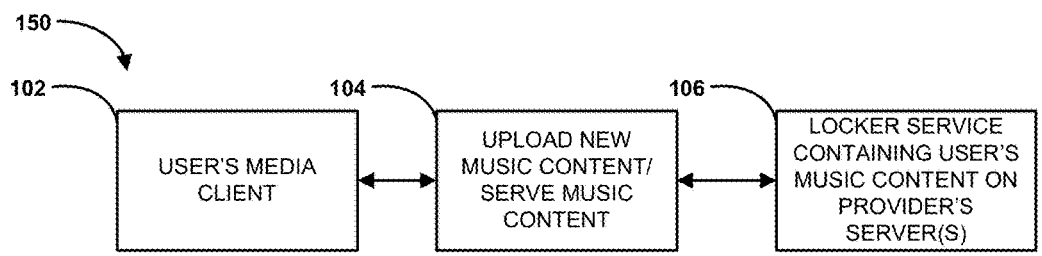
FIG. 1B is a simplified block diagram of a process for using the online storage system, for implementing embodiments of the present disclosure.

FIG. 1B is a simplified block diagram of a process 150 for using the online storage system 100, for implementing embodiments of the present disclosure. A request to upload new music content or serve stored music content 104 can originate in the user's music content client 102 and received in the online music content provider's server 112.

The user can initiate an upload request 104 to upload, or add with uploading or linking, the new music track to the user's locker service 106. The upload request 104 is received by the online music provider's server 112. Applications on the online music provider's server 112 then upload the new music track to the respective user's music collection 206A-n.

The user's music content client 102 can also initiate a download or streaming request 104 to request music track previously stored in the respective user's music collection 206A-n. The serve music request 104 is received by the online music provider's server 112. Applications on the online music provider's server 112 then retrieve the requested music track from the respective user's music collection 206A-n. The music provider's server 112 then serves the requested music track to the user's music content client 102.

Figure 1C:
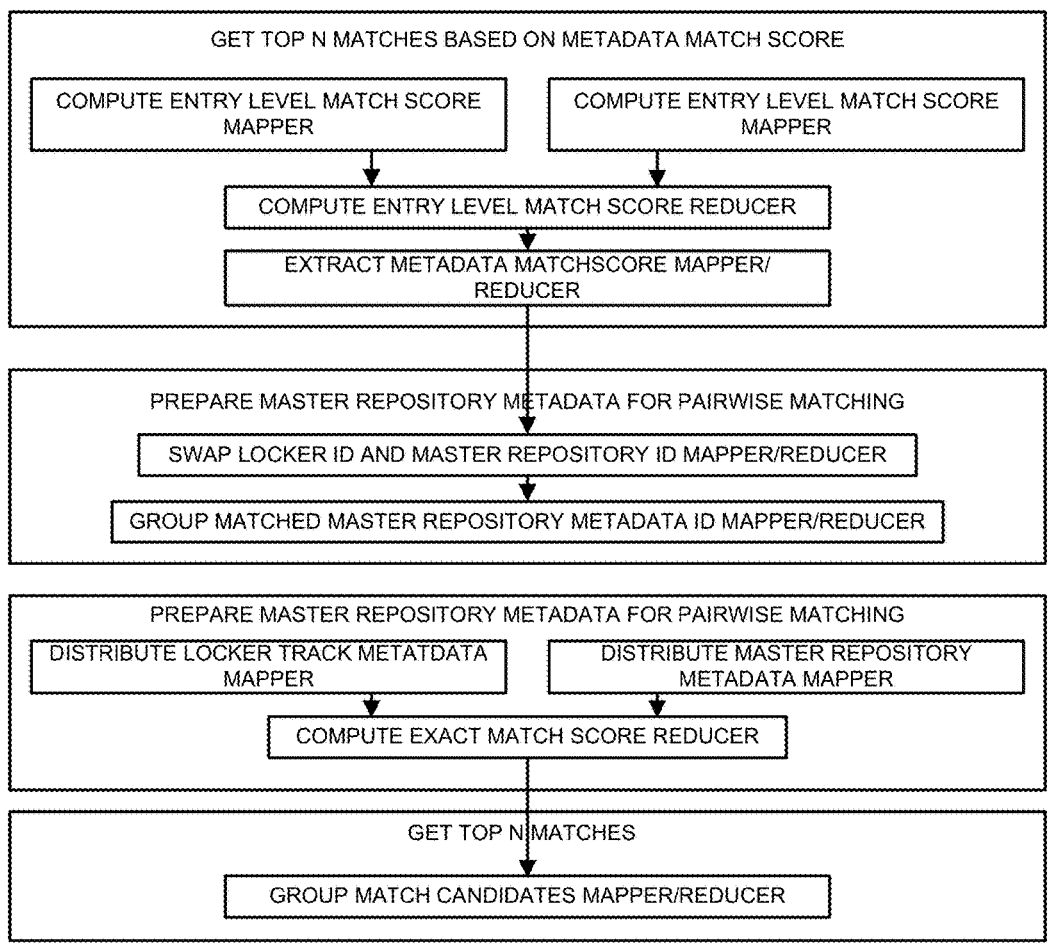
FIG. 1C is a simplified block diagram of another approach to process matching pairs of tracks in the online storage system, for implementing embodiments of the present disclosure.

FIG. 1C is a simplified block diagram of another approach to process matching pairs of tracks in the online storage system 100, for implementing embodiments of the present disclosure. The tokenize track mapper extracts the tokens for locker or master repository track metadata. The track metadata (either locker metadata or master repository metadata) is used as input. A key metadata token and a value token scoring info, track id and track metadata are output. The compute entry level match score mapper derives from the tokenize track mapper and takes the locker track and/or master repository track as input. The input key can be the track ID. It will output the match entry per token to the reducer to extract the entry level match score.

The compute entry level match score reducer extracts the entry match metadata match score for pairs of master repository track metadata and locker track metadata. The output includes a key metadata token value for track match candidates. The entry level match score for pairs of master repository track metadata and locker track metadata.

The extract metadata match score mapper outputs the entry level match info keyed by the query metadata ID. The scoring mechanism used can be any suitable scoring mechanism such as, Jaccard scoring or a similar scoring methodology. Inputs include a key index token and a value of the entry level match score with proto metadata match candidates which is the output of consume entry level score reducer. Outputs include the key query locker track ID and a value of the entry level match score with proto metadata match candidates.

The extract metadata match score reducer accumulates the entry level match score and outputs the match candidates based on the match metadata match score. Inputs are key query locker track ID and value of all the entry level match score with proto metadata match candidate which is the output of the extract metadata match score mapper. Outputs include a key query locker track ID, a value for the match candidates based on match metadata match score.

The swap locker ID and master repository ID mapper/ swap locker ID and Master repository ID reducer for each master repository track, accumulates all the locker tracks which take this master repository track as a match candidate.

The group matched master repository metadata mapper collects the master repository track metadata of all the match candidates for each locker track. This is a mr with joint map input. Input include master repository track metadata sstable and joint input sstable for mapping between master repository ID and list of locker track IDs. Just the output of swap locker ID and master repository ID reducer. The outputs include key locker track ID and a value of the master repository track metadata which is the match candidate for the locker track.

The distribute locked track metadata mapper/distribute master repository metadata mapper Reads locked track metadata and the match candidate master repository track metadata and output it to the reducer to extract the exact match metadata match score. Test results of one embodiment are shown in Table 1.

TABLE 1

| Steps | Time | Disk Usage |
| --- | --- | --- |
| 1. Dedupe the original locker track metadata | 18 minutes | 1 T |
| 2. Tokenize master repository and locker tracks & compute the entry level matching metadata match score. | ~1 hour | 35 T |
| 3. Extract metadata match score Mr. | ~2 hours | 2 T |
| 4. Two Mr to prepare the Pairwise matching metadata. | 50 minutes | 3 T |
| 5. Extract pairwise exact match metadata match score from match candidates | 4-5 hours 10 G | 10 G |

Figure 1D:
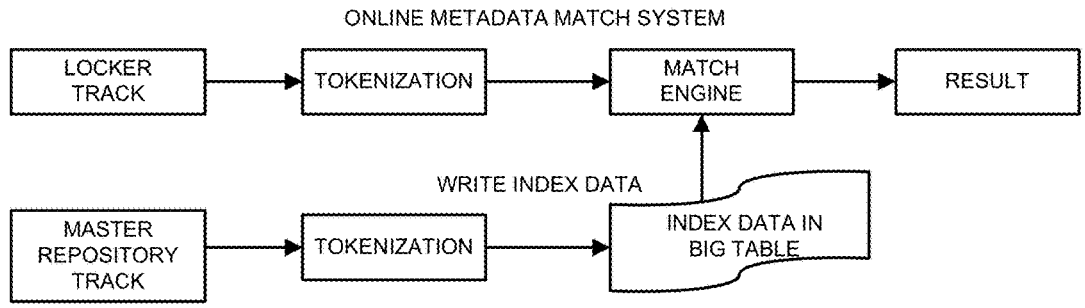
FIG. 1D is an overview of an online metadata match system, for implementing embodiments of the present disclosure.

FIG. 1D is an overview of an online metadata match system, for implementing embodiments of the present disclosure. Locker tracks are tracks selected from the user collections 206A-n in the locker service 106. The locker tracks are tokenized such as hashed or otherwise represented by a token that can be utilized for comparison purposes. The match engine compares the tokenized tracks to produce match candidate results.

Tracks from the master repository are similarly tokenized and the respective token is stored with the index data in the big table corresponding to each track. The match engine can compare the tracks from the master repository and the tracks from the user collections 206A-n to identify match candidate results.

Figure 1E:
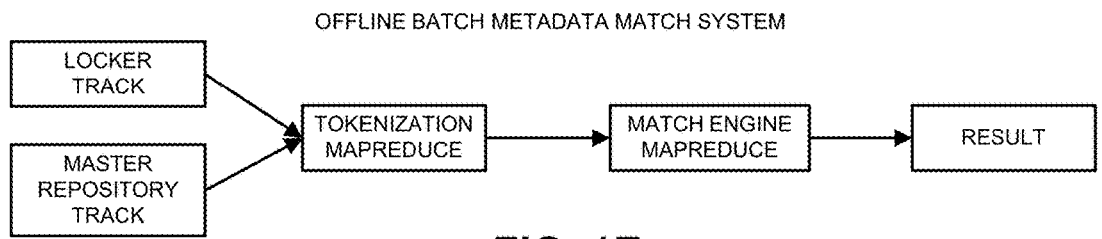
FIG. 1E is an overview of an offline or batch metadata match system, for implementing embodiments of the present disclosure.

FIG. 1E is an overview of an offline or batch metadata match system, for implementing embodiments of the present disclosure. Locker tracks and/or tracks from the master repository are tokenized as described in more detail elsewhere in this disclosure. The match engine compares the tokenized tracks to produce match candidate results.

Figure 1F:
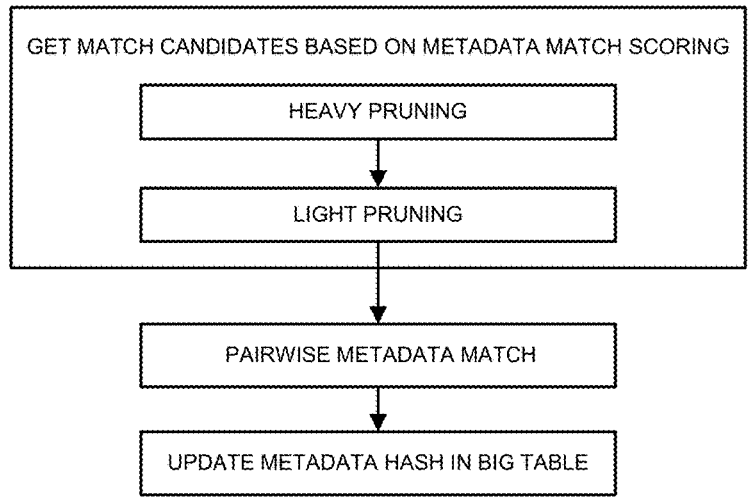
FIGS. 1F and 1G are an overview of a metadata deduping process, for implementing embodiments of the present disclosure.
Figure 1G:
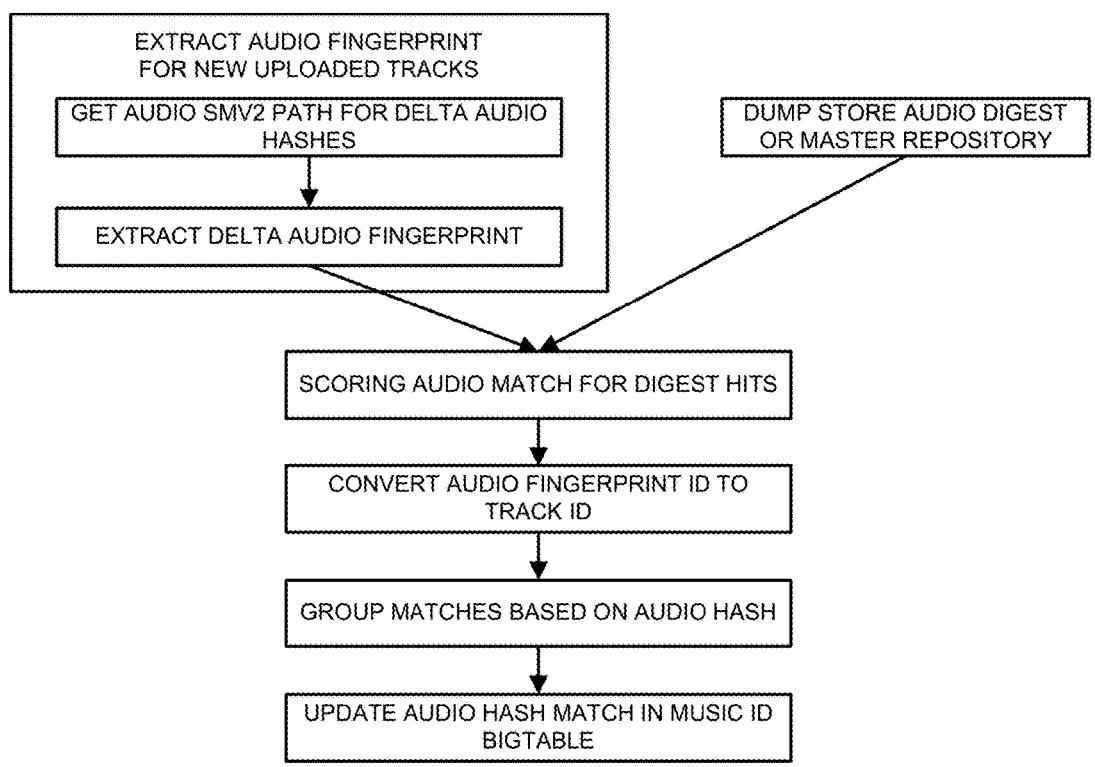

FIGS. 1F and 1G are an overview of a metadata deduping process, for implementing embodiments of the present disclosure. The metadata deduping process is a two stage process of heavy pruning or deduping and replacing the duplicate tracks from the user collections 206A-n followed by a lighter pruning by comparing the remaining tracks in the user collections to the master repository.

Figure 2:
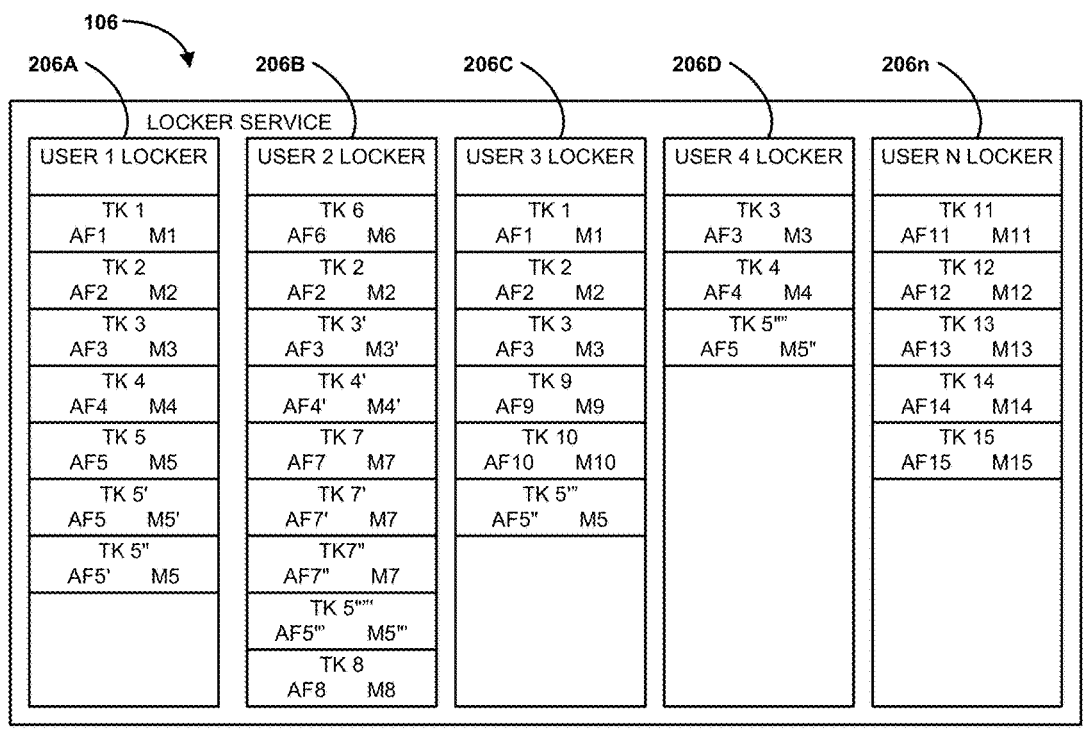
FIG. 2 is a simplified schematic of a locker service, for implementing embodiments of the present disclosure.

FIG. 2 is a simplified schematic of a locker service 106, for implementing embodiments of the present disclosure. The locker service 106 includes music collections 206A-n for multiple respective users. The users 1-n have stored their respective music data files within their respective music collections 206A-n. Each of the music data files is referred to as a track, e.g., track TK1 through track TK15. Each track TK1-15 includes one or more corresponding audio files, e.g., AF1-15, and one or more corresponding metadata files, e.g., M1-15. By way of example, User 1 locker 206A includes track TK1. Track TK1 includes audio files AF1 and metadata files M1.

Often users store or associate duplicate tracks in their respective music collections 206A-n. By way of example, User 1 music collection 206A includes track TK5 and tracks TK5' and TK5" which are substantial duplicates of track TK5. The substantial duplicate tracks TK5', TK5" may be the same or different versions of track TK5. For example, track TK5 contains a complete metadata file M5 including the author, title, date recorded, performer, etc. In contrast, track TK5' includes an incomplete metadata file M5' including only title and performer. In another example, track TK5 contains high quality audio files AF5 while track TK5" may include a lower quality audio file AF5' such as an MP3. In an alternative example, audio files AF5 may include a high quality studio version of the music track, where audio file AF5' may contain a live recording of a concert performance of the same music. It should be understood that the contents of a metadata file M5 being complete and containing only the author, title, date recorded and performer, is merely examples and more or fewer data fields can be included in the metadata.

Figure 3A:
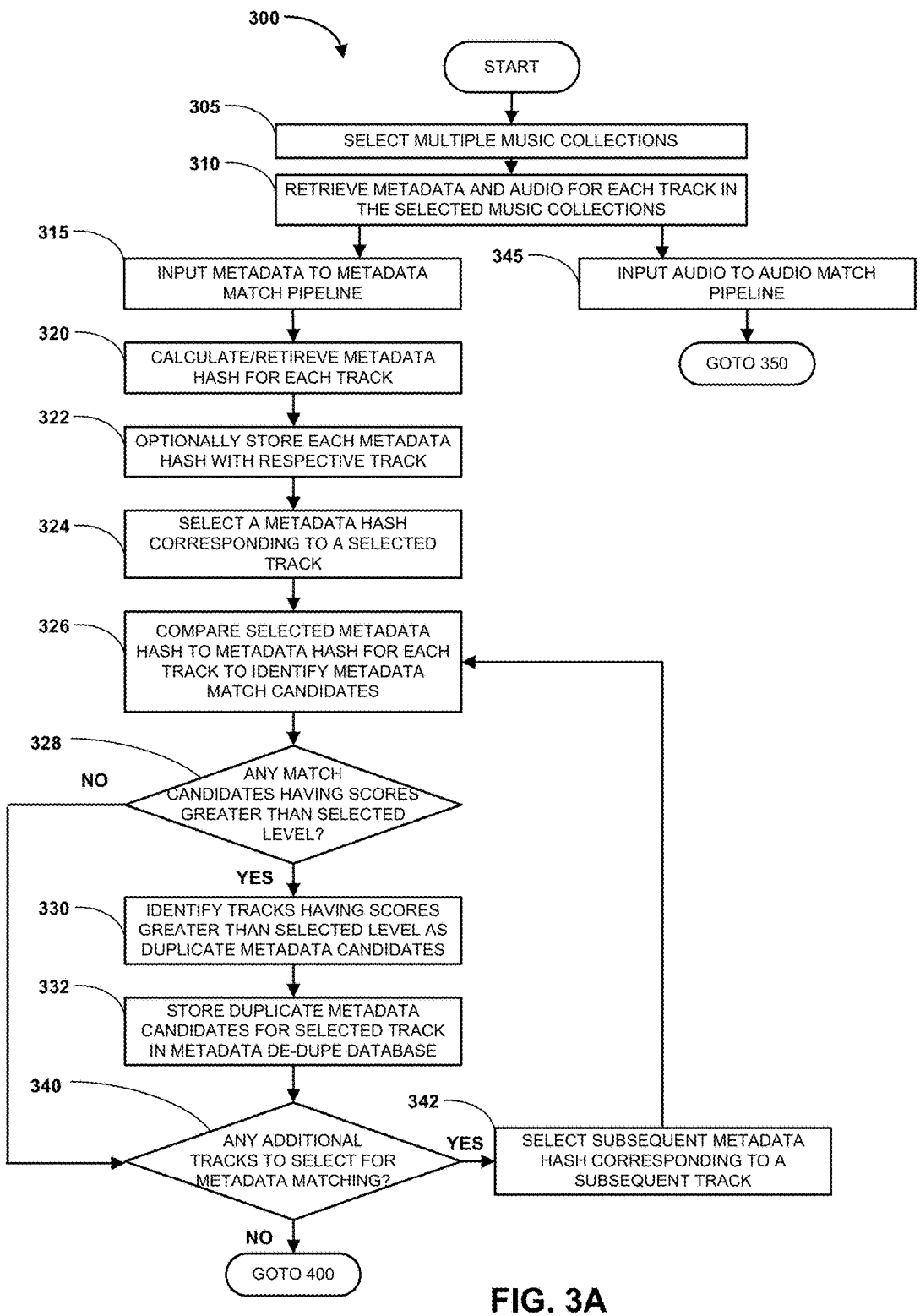
FIG. 3A is a flowchart diagram for the method operations for de-duping duplicate track candidates from locker service, for implementing embodiments of the present disclosure.

FIG. 3A is a flowchart diagram for the method operations 300 for de-duping duplicate track candidates from locker service 106, for implementing embodiments of the present disclosure. In an operation 305, multiple users' music collections 206A-n are selected for de-duping process. It should be noted that multiple different tracks from one or more users' collections can be selected in a batch. The selected batch of tracks can be selected based on matching tokens. The multiple different tracks can be included in a single batch for comparison and analysis. In an operation 310, the metadata files and audio data files for each selected track in the selected music collections 206A-n are retrieved from the selected music collections 206A-n.

In an operation 315, the metadata is input to the metadata match pipeline 122 and the metadata match pipeline operation continues in an operation 320, as described below. In an operation 345, the audio data files are input to the audio match pipeline 124 and the audio match pipeline operation continues in the method operations 350, as described in FIG. 3B, below.

It should be noted that the metadata match pipeline 122 and the audio match pipeline 124 can be operated in parallel or sequentially or in alternating between the two pipelines or batch processing multiple tracks' metadata and audio data files or any other suitable processing regimen. As described herein the metadata match pipeline 122 and the audio match pipeline 124 can perform their respective processes in non-real time such as an on-going server clean-up process. However, it should be understood that the metadata match pipeline and the audio match pipeline can perform their respective processes in real or near real time such as if initiated by a track upload request or a track download/streaming request.

It should also be understood that different portions of the method operations described herein can occur in different sequence and separated in time. By way of example, calculating the metadata hash in operation 320 and the audio fingerprint of operation 352 and the audio hash of operation 420 for a respective track, could be completed as part of storing the track to the user's respective music collection and the respective metadata hash, audio fingerprint and audio hash stored within the metadata files of the respective track.

In an operation 320, a metadata hash is calculated for each of the tracks TK1-15 stored the selected users' music collections 201A-n. In an optional operation 322, the metadata hash for all of the tracks TK1-15 can be stored in the respective tracks in each of the selected users' music collections 206A-n. If the metadata hash has previously been stored in the respective tracks in each of the selected users' music collections 206A-n, operation 320 can include retrieving the previously stored metadata hash.

A metadata hash for one of the tracks TK1-15 is selected in an operation 324. In an operation 326, the metadata hash for each of the tracks TK1-15 are compared to the selected metadata hash to identify a plurality of metadata match candidates. Comparing the selected data hash to the metadata hash corresponding to each of the tracks TK1-15 yields a difference metadata match score using a Jaccard or similar scoring function.

By way of example: Metadata M5 of track TK5 includes:
Title: A Hard Days Night
Author: John Lennon
Recording artist: Beatles
Lead vocals: Paul McCartney and John Lennon
Release date: 1964
Metadata M5' of track TK5' includes:
Title: A Hard Days Night
Author: John Lennon
Recording artist: (BLANK)
Lead vocals: (BLANK)
Release date: 1964

Comparing the five data fields of metadata M5 of track TK5 to the five data fields of metadata M5' of track TK5' yields three intersecting or common data fields: Title, Author and Year. Two data fields are not intersecting: Recording artist and Lead vocals. Using a Jaccard scoring or similar scoring system gives a 3/5 metadata match score.

In a further example: Metadata M4 of track TK4 includes:
Title: Born This Way
Author: Lady Gaga and Jeppe Laursen
Recording artist: Lady Gaga
Lead vocals: Lady Gaga
Release date: 2011

Comparing the five data fields of metadata M5 of track TK5 to the five data fields of metadata M4 of track TK4 yields no intersecting data fields yielding a metadata match score of 0/5 score. It should be noted that while the above example uses five fields in the metadata, more than or less than five fields of metadata could also be used in a similar manner.

In an operation 328, if there are any metadata comparison scores greater than a selected level as compared to the selected track TK5, then the method operations continue in an operation 330. By way of example, a metadata comparison score threshold level of 3/5 could be selected.

In operation 330, tracks having metadata comparison scores greater than the selected level are identified as duplicate metadata candidates of TK5 and the duplicate metadata candidates of TK5 can be stored in a metadata de-dupe database in an operation 332 and the method operations continue in an operation 340.

If, in operation 328, if there no metadata comparison scores greater than the selected threshold level as compared to the selected track, then the method operations continue in an operation 340. In operation 340, if there are additional tracks to select for metadata matching then a corresponding metadata hash for a subsequent track is selected in an operation 342 and the method operations continue in operation 326 as described above. If in operation 340, if there are no additional tracks to select for metadata matching then the method operations continue in the method operations 400 as described in FIG. 4, below.

Figure 3B:
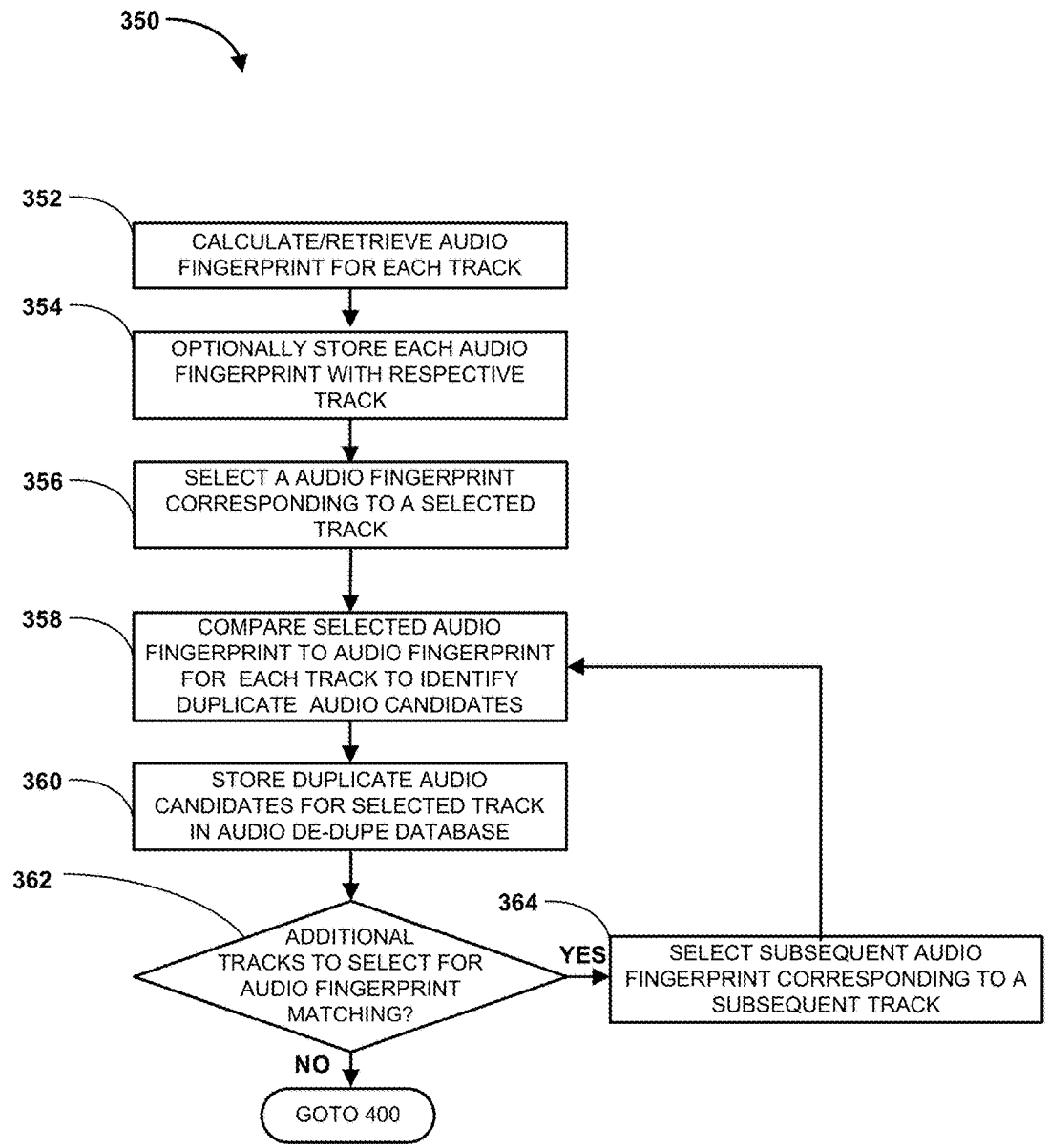
FIG. 3B is a flowchart diagram for the method operations for de-duping duplicate audio track candidates from locker service, for implementing embodiments of the present disclosure.

FIG. 3B is a flowchart diagram for the method operations 350 for de-duping duplicate audio track candidates from locker service 106, for implementing embodiments of the present disclosure. In an operation 352, an audio fingerprint is calculated for each of the tracks TK1-15 stored the selected users' music collections 201A-n. Calculating audio fingerprints are well known in the art and any suitable audio fingerprinting technique can be used.

In an optional operation 354, the audio fingerprint for all of the tracks TK1-15 can be stored in the respective tracks in each of the selected users' music collections 206A-n. If the audio fingerprint has previously been stored in the respective tracks in each of the selected users' music collections 206A-n, operation 352 can include retrieving the previously stored audio fingerprint.

In an operation 356, a corresponding audio fingerprint is selected from one of the tracks TK1-15. The audio fingerprint corresponding to each of the tracks TK1-15 are compared to the selected audio fingerprint to identify one or more audio match candidates, in an operation 358. Typical audio fingerprints allow for matching of tracks containing the same audio at drastically different quality levels. Thus allowing de-duping the same recording across many different audio formats and compression levels.

In an operation 360, the one or more audio match candidates are stored in an audio de-dupe database. If additional tracks remain to be tested for audio matching in an operation 362, then the method operations continue in an operation 364 where a subsequent audio fingerprint is selected and the method operations continue in operation 358 described above. If no additional tracks remain to be tested for audio matching in operation 362, then the method operations continue in the method operations 400 described in FIG. 4, below.

Figure 4:
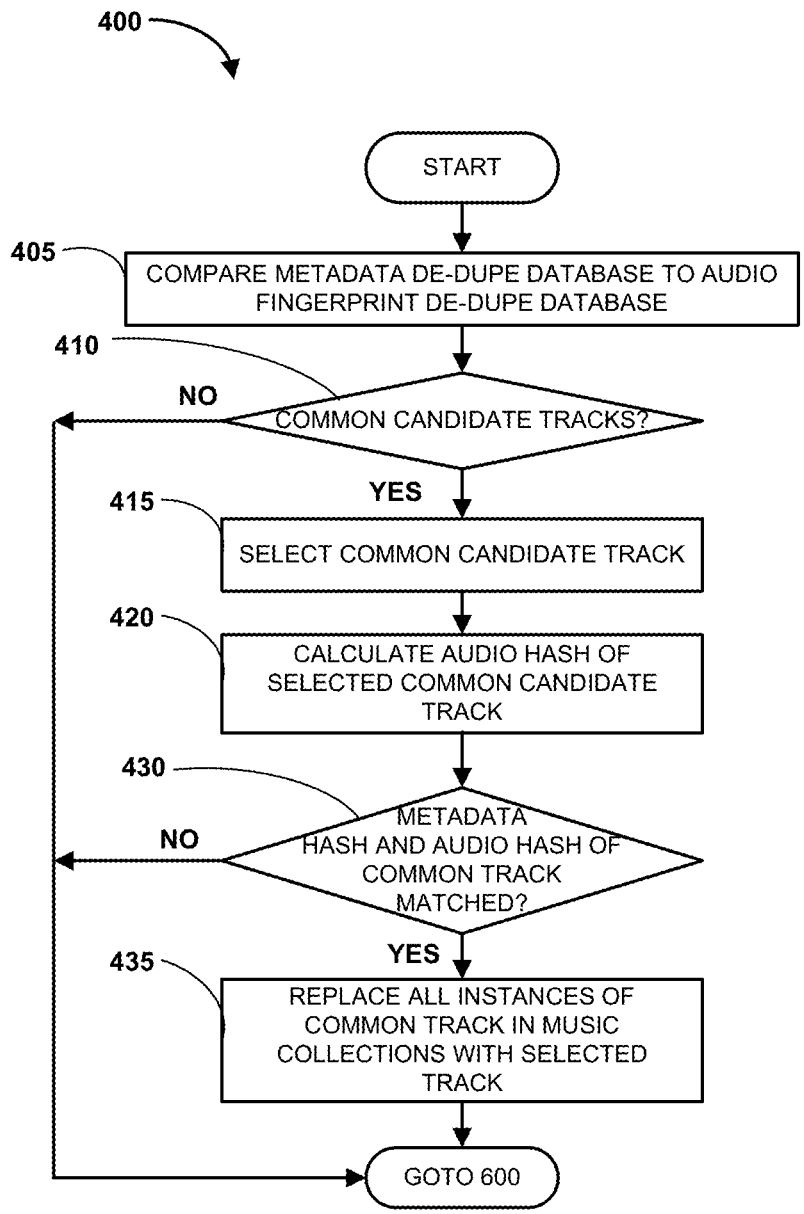
FIG. 4 is a flowchart diagram for the method operations for de-duping duplicate metadata and audio track candidates from locker service, for implementing embodiments of the present disclosure.

FIG. 4 is a flowchart diagram for the method operations 400 for de-duping duplicate metadata and audio track candidates from locker service 106, for implementing embodiments of the present disclosure. In an operation 405, the metadata database and the audio fingerprint database are examined. If there are common tracks in both of the metadata database and the audio fingerprint database, then the method operations continue in an operation 415. If there are no common tracks in both of the metadata database and the audio fingerprint database, then the method operations continue in the method operations 600 described in FIG. 6, below.

In operation 415, a common track is selected from the metadata database and the audio fingerprint database. In an operation 420, an audio hash of the entire audio file is calculated for both of the selected duplicate candidates from the respective metadata database and the audio fingerprint database. As described above, the audio hash may have previously been calculated and stored with the metadata of the track and in such an instance, operation 420 can include retrieving the previously stored audio hash.

In an operation 430, the calculated audio hash of the selected metadata match candidate is compared to the audio hash of the selected audio match candidate. If the calculated audio hash of the selected metadata match candidate is not equal to the audio hash of the selected audio match candidate then the method operations continue in the method operations 600 described in FIG. 6, below. If the calculated audio hash of the selected metadata match candidate is equal to the audio hash of the selected audio match candidate then the method operations continue in an operation 435.

In operation 435, all instances of the common track in the music collections 206A-n are replaced by the selected metadata match candidate. Alternatively, all instances of the common track in the music collection 206A-n can be replaced by the selected audio match candidate. An example of the replacement of the instances of the common track is described in FIGS. 5A-C, below. The method operations continue in the method operations 600 described in FIG. 6, below.

FIG. 5A is a listing 500 of the duplicate track candidates extracted from the locker service 106, for implementing embodiments of the present disclosure. The listing of the duplicate track candidates 500 identified in the above operations of FIGS. 3A, 3B and 4 includes tracks TK3, TK3', TK4, TK4', TK5, TK5', TK5'', TK5''', TK5'''', TK5''''', TK7, TK7' and TK7''.

FIG. 5B is a listing 500' of the de-duped duplicate track candidates extracted from the locker service 106, for implementing embodiments of the present disclosure. The listing of the de-duped duplicate track candidates 500' is reduced by operation 435 in FIG. 4. Replacing the duplicate candidate tracks reduces the thirteen duplicate candidate tracks to five de-duped tracks TK3, TK4, TK5, TK5A and TK7.

Figure 5C:
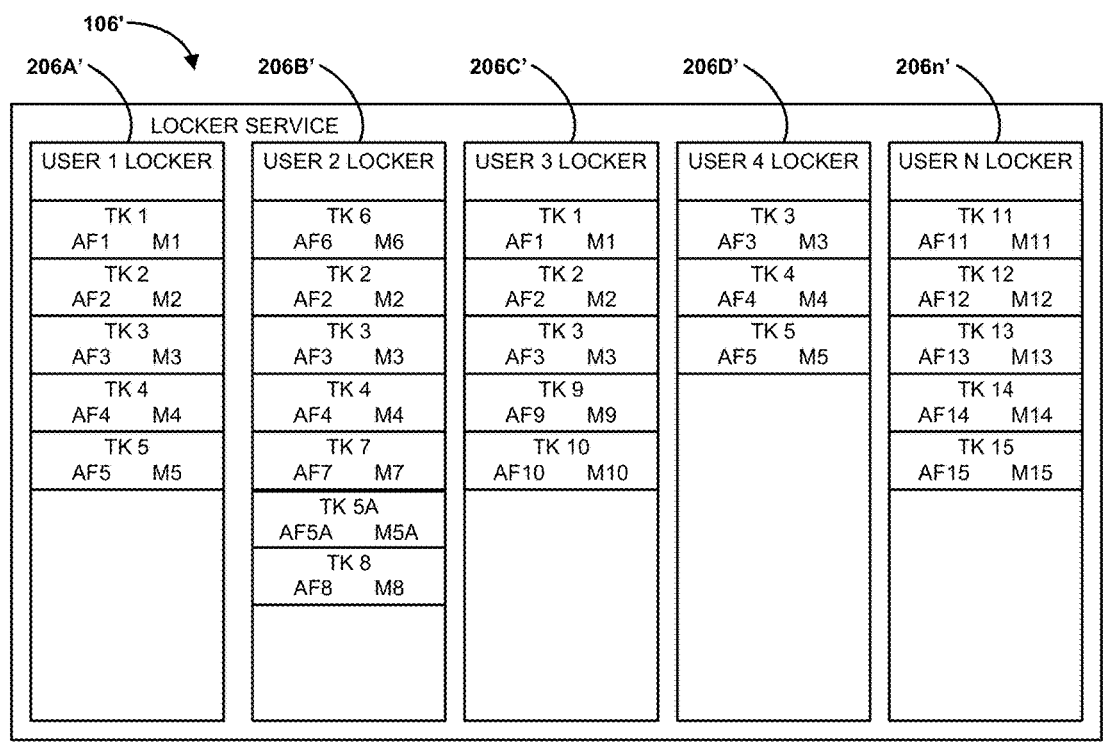
FIG. 5C is a simplified schematic of a de-duped locker service including the de-duped duplicate track candidates, for implementing embodiments of the present disclosure.

FIG. 5C is a simplified schematic of a de-duped locker service 106' including the de-duped duplicate track candidates, for implementing embodiments of the present disclosure. The de-duped locker service 106' includes tracks TK3 and TK4 in place of track TK3' and track TK4', respectively, in user 2 locker 206B. The de-duped locker service 106' also includes track TK5 in place of tracks TK5', TK5'', TK5''' and in locker 206A, 206C and 206D, respectively. The de-duped locker service 106' also includes track TK5A in place of track TK5'''' in locker 206B. The de-duped locker service 106' also includes track TK7 in place of tracks TK7' and TK7'' in locker 206B.

As described above, the duplicated tracks in the users' music collections 206A-n are reduced. However, often there are duplicate tracks stored in the users' music collections 206A-n and in the music provider's master music content repository 114. This provides yet another duplicate track reduction opportunity as set forth in the following description.

Figure 6A:
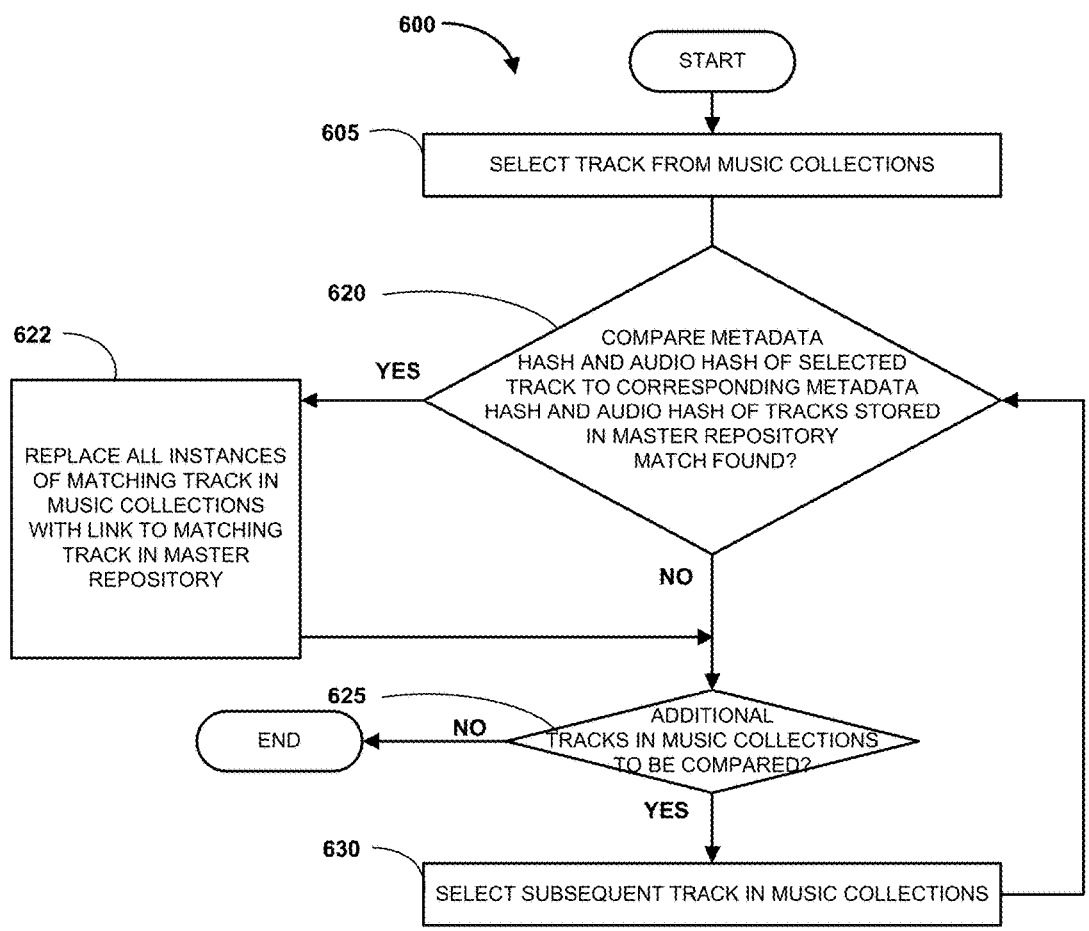
FIG. 6A is a flowchart diagram for the method operations for removing tracks that are duplicated in the music collections and master music content repository, for implementing embodiments of the present disclosure.

FIG. 6A is a flowchart diagram for the method operations 600 for removing tracks that are duplicated in the music collections 206A-n and master music content repository 114, for implementing embodiments of the present disclosure. In an operation 605 one of the tracks is selected from the users' music collections 206A-n.

The metadata hash and the audio hash of the selected track is compared to the corresponding metadata hash and the audio hash of each of the tracks stored in the master music content repository 114, in an operation 615.

If a match is found, then all instances of the matching track stored in the music collections 206A-n are replaced by a logical link, such as a hyperlink, a reference or a pointer, to the matching track in the master music content repository 114, in an operation 622 and the method operations continue in an operation 625. If no match is found in operation 615, then the method operations continue in operation 625.

If additional music collection tracks remain to be compared to the master music content repository 114 in operation 625, then the method operations continue in an operation 630. In operation 630, a subsequent track is selected from the music collections 206A-n and the method operations continue in operation 615 above. If, in operation 625, no additional music collection tracks remain to be compared to the master music content repository 114, then the method operations can end.

Figure 6B:
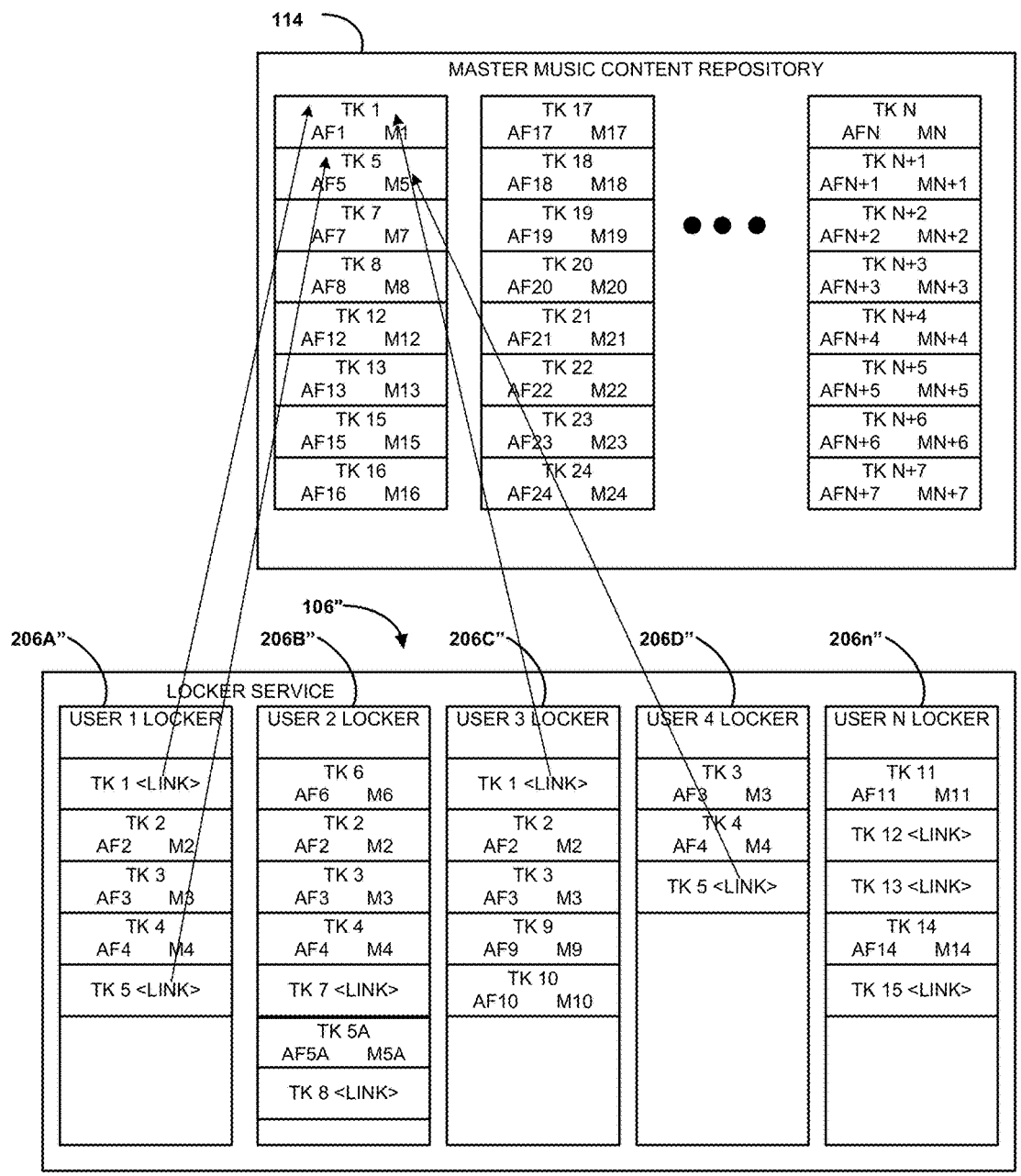
FIG. 6B is a simplified schematic of a fully de-duped locker service, for implementing embodiments of the present disclosure.

FIG. 6B is a simplified schematic of a fully de-duped locker service 106", for implementing embodiments of the present disclosure. The fully de-duped locker service 106" includes links to corresponding tracks in the master music content repository 114. By way of example, links to track TK1 in the master music content repository 114 has replaced both instances of track TK1 in the music collections 206A" and 206C". Similarly, links to track TK5 in the master music content repository 114 has replaced both instances of track TK5 in the music collections 206A" and 206D". Also similarly, links to respective tracks in the master music content repository 114 have replaced all instances of tracks TK7, 8, 12, 13 and 15 in the fully de-duped collections 206A"-n". As explained above, the de-duping process can operate on any storage having files, data, music files, audio files or video files. In one implementation, a user account in an online music service can present to a user a listing of all songs or other media associated with the user account. The files may, in one embodiment, be stored in a shared storage. For instance, the shared storage may include the same song stored multiple times with slightly different names or titles such as words transposed, misspelled, missing or added words. Thus, the deduping process can operate on the listings of songs in individual users' accounts and/or on shared storage of a music service. In either implementation, reducing duplicates reduces the storage load on a system and may allow for processing efficiencies and to reduce power consumption.

Yet another advantage of matching a locker track to a corresponding master repository track is the additional information contained in the master repository can be made available to the users. By way of example, the master repository track may include additional metadata to complete the metadata fields missing from the user's locker track. Further, additional data such as the corresponding cover artwork could be included in the master repository track.

Further still, the master repository track may include information relating to similar tracks that may be of interest to the user. By way of example, the master repository track may include information about similar or related tracks that other users have identified, compared to or related to the master repository track. The master repository track may also include other tracks that other users and other sources such as experts, artists, critics, published lists, etc., have accessed with or otherwise grouped with the master repository track. This type of related track information can then be used to suggest additional tracks that the user may enjoy. These types of correlations and relatedness would be missing from the user's individual locker tracks without matching the track to a master repository track.

Figure 7:
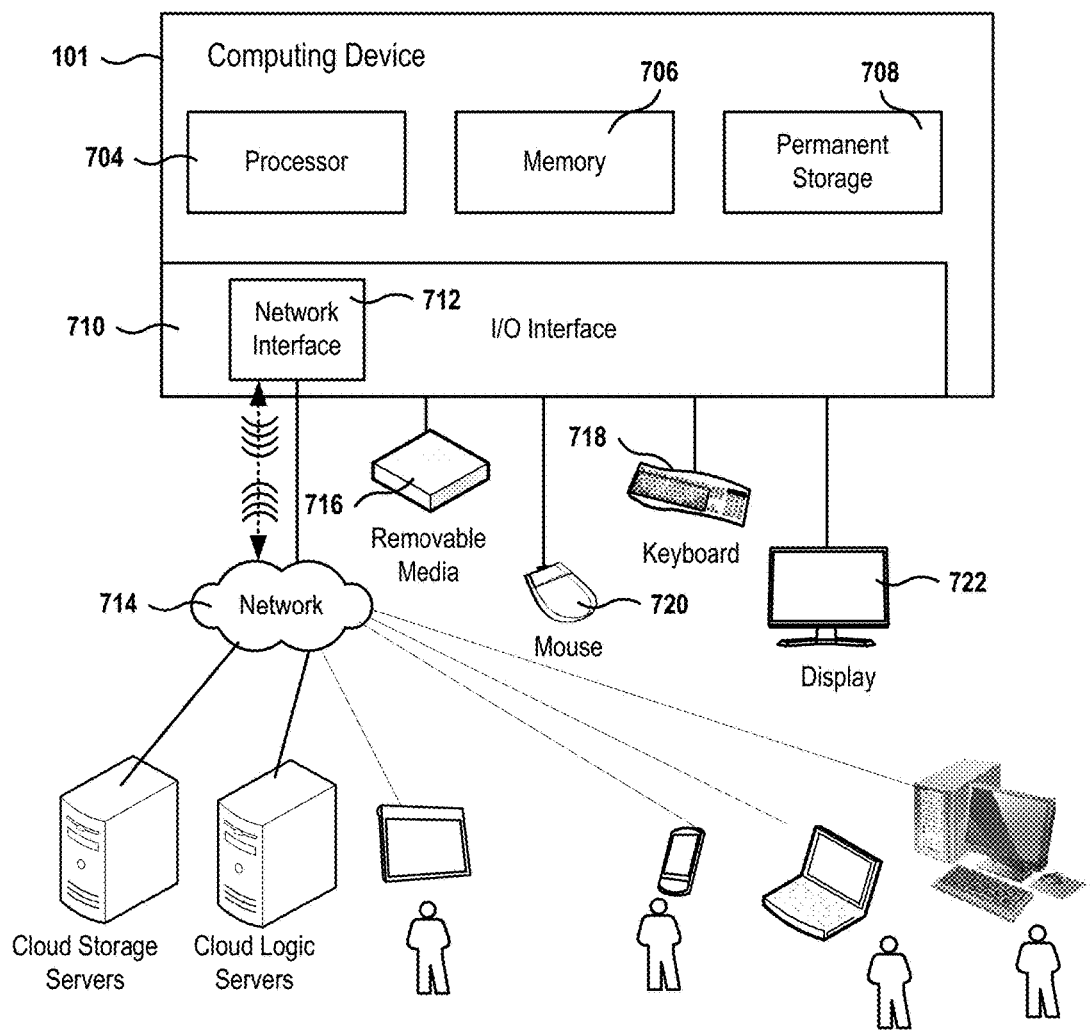
FIG. 7 is a simplified schematic diagram of a computer system for implementing embodiments of the present disclosure.

FIG. 7 is a simplified schematic diagram of a computer system 702 for implementing embodiments of the present disclosure. FIG. 7 depicts an example computer environment for implementing embodiments of the disclosure. It should be appreciated that the methods described herein may be performed with a digital processing system, e.g., a conventional, general-purpose computer system. Special purpose computers, which are designed or programmed to perform only one function, may be used in the alternative. The computer system 702 includes a processor 704, which is coupled through a bus to memory 706, permanent storage 708, and Input/Output (I/O) interface 710.

Permanent storage 708 represents a persistent data storage device e.g., a hard drive or a USB drive, which may be local or remote. Network interface 712 provides connections via network 714, allowing communications (wired or wireless) with other devices. It should be appreciated that processor 704 may be embodied in a general-purpose processor, a special purpose processor, or a specially programmed logic device. Input/Output (I/O) interface 710 provides communication with different peripherals and is connected with processor 704, memory 706, and permanent storage 708, through the bus. Sample peripherals include display 722, keyboard 718, mouse 720, removable media device 716, etc.

Display 722 is configured to display the user interfaces described herein. Keyboard 718, mouse 720, removable media device 716, and other peripherals are coupled to I/O interface 710 in order to exchange information with processor 704. It should be appreciated that data to and from external devices may be communicated through I/O interface 710. Embodiments of the disclosure can also be practiced in distributed computing environments where tasks are performed by remote processing devices that are linked through a wired or a wireless network.

Embodiments of the present disclosure can be fabricated as computer readable code on a non-transitory computer readable storage medium. The non-transitory computer readable storage medium holds data which can be read by a computer system. Examples of the non-transitory computer readable storage medium include permanent storage 708, network attached storage (NAS), read-only memory or random-access memory in memory module 706, Compact Discs (CD), Blu-ray™ discs, flash drives, hard drives, magnetic tapes, and other data storage devices. The non-transitory computer readable storage medium may be distributed over a network coupled computer system so that the computer readable code is stored and executed in a distributed fashion.

Additionally, FIG. 7 shows various types of devices that can connect to the network, e.g., the Internet. The devices include servers, tablet computers, smartphones, laptops, desktops, etc. The various devices and run operating systems and the operating systems can vary from manufacturer to manufacturer.

Some, or all operations of the method presented herein are executed through a processor, e.g., processor 704 of FIG. 7. Additionally, although the method operations were described in a specific order, it should be understood that some operations may be performed in a different order, when the order of the operations do not affect the expected results.

In addition, other operations may be included in the methods presented, and the operations may be performed by different entities in a distributed fashion, as long as the processing of the operations is performed in the desired way.

Any of the operations described herein that form part of the disclosure are useful machine operations. The disclosure also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The disclosure can also be embodied as computer readable code and/or logic on a computer readable medium. The computer readable medium is any data storage device that can store data which can thereafter be read by a computer system. Examples of the computer readable medium include hard drives, network attached storage (NAS), logic circuits, read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in the above figures are not required to be performed in the order illustrated, and that all the processing represented by the operations may not be necessary to practice the disclosure. Further, the processes described in any of the above figures can also be implemented in software stored in any one of or combinations of the RAM, the ROM, or the hard disk drive.

Although the foregoing has been described in some detail for purposes of clarity of understanding, it will be apparent that certain changes and modifications may be practiced within the scope of the appended claims. Accordingly, the present embodiments are to be considered as illustrative and not restrictive, and the disclosed concepts and ideas are not to be limited to the details given herein, but may be modified within the scope and equivalents of the appended claims.

What is claimed is:

1. A method for reducing duplication of tracks associated with a user account of an online music provider, comprising:
   selecting a plurality of user music collections stored in a locker service of the online music provider;
   selecting a track in the selected plurality of user music collections;
   inputting metadata, from the selected plurality of user music collections, into a metadata match pipeline;
   inputting audio data, from the selected plurality of user music collections, into an audio match pipeline;
   identifying, through a process of the metadata match pipeline, a plurality of duplicate metadata candidate tracks from the metadata by comparing metadata of the selected track with metadata of other tracks in the selected plurality of user music collections;
   identifying, through a process of the audio match pipeline, a plurality of duplicate audio candidate tracks from the audio data by comparing audio data of the selected track with audio data of other tracks in the selected plurality of user music collection;
   identifying a plurality of common duplicate tracks including comparing the identified plurality of duplicate metadata candidate tracks to the identified plurality of duplicate audio candidate tracks;
   calculating, for each of the plurality of common duplicate tracks, a corresponding audio hash of an entire audio file;
   selecting an audio hash of one of the plurality of common duplicate tracks;
   identifying a matching track including comparing the selected audio hash to a remainder of the audio hashes of the plurality of common duplicate tracks;
   replacing all instances of the matching track in the selected plurality of user music collections with the selected track;
   identifying a plurality of duplicate tracks in the selected plurality of user music collections, wherein each of the plurality of duplicate tracks is a duplicate of a corresponding track stored in a master content repository; and
   replacing the each of the plurality of duplicate tracks in the selected plurality of user music collections with a logical link to the corresponding track stored in the master content repository, the method being executed by a processor.

2. The method of claim 1, wherein the identifying the plurality of duplicate metadata candidate tracks includes comparing a metadata hash for the selected track to a corresponding metadata hash for each track in the selected plurality of user music collections.

3. The method of claim 2, further comprising scoring the corresponding metadata hash for the each track in the selected plurality of user music collections.

4. The method of claim 3, wherein the identifying the plurality of duplicate metadata candidate tracks includes selecting a set of tracks from the selected plurality of user music collections in which each track in the set of tracks has a score equal to or greater than a selected level.

5. The method of claim 1, wherein the identifying the plurality of duplicate audio candidate tracks includes calculating an audio fingerprint for each track in the selected plurality of user music collections.

6. The method of claim 5, further comprising:
   selecting an audio fingerprint corresponding to a track in the selected plurality of user music collections; and
   comparing the selected audio fingerprint to a corresponding audio fingerprint for the each track in the selected plurality of user music collections.

7. The method of claim 1, wherein the replacing all instances of the matching track in the selected plurality of user music collections with the selected track includes at least one of a group consisting of:
   outputting additional metadata to the user;
   outputting one or more recommendations based on a corresponding master repository track; and
   outputting additional information regarding the selected track including album art, additional description data, details, and artist art.

8. The method of claim 1, wherein the selecting the track in the selected plurality of user music collections includes selecting a plurality of tracks.

9. A system, comprising:
   a memory and a processor, the processor configured to execute program instructions, stored in the memory, for:
      selecting a plurality of user music collections stored in a locker service of the online music provider;
      selecting a track in the selected plurality of user music collections;

inputting metadata, from the selected plurality of user music collections, into a metadata match pipeline;

inputting audio data, from the selected plurality of user music collections, into an audio match pipeline;

identifying, through a process of the metadata match pipeline, a plurality of duplicate metadata candidate tracks from the metadata by comparing metadata of the selected track with metadata of other tracks in the selected plurality of user music collections;

identifying, through a process of the audio match pipeline, a plurality of duplicate audio candidate tracks from the audio data by comparing audio data of the selected track with audio data of other tracks in the selected plurality of user music collection;

identifying a plurality of common duplicate tracks including comparing the identified plurality of duplicate metadata candidate tracks to the identified plurality of duplicate audio candidate tracks;

calculating, for each of the plurality of common duplicate tracks, a corresponding audio hash of an entire audio file;

selecting an audio hash of one of the plurality of common duplicate tracks;

identifying a matching track including comparing the selected audio hash to a remainder of the audio hashes of the plurality of common duplicate tracks;

replacing all instances of the matching track in the selected plurality of user music collections with the selected track;

identifying a plurality of duplicate tracks in the selected plurality of user music collections, wherein each of the plurality of duplicate tracks is a duplicate of a corresponding track stored in a master content repository; and replacing the each of the plurality of duplicate tracks in the selected plurality of user music collections with a logical link to the corresponding track stored in the master content repository, the method being executed by a processor.

10. The system of claim 9, wherein the identifying the plurality of duplicate metadata candidate tracks includes comparing a metadata hash for the selected track to a corresponding metadata hash for each track in the selected plurality of user music collections.

11. The system of claim 10, further comprising program instructions for scoring the corresponding metadata hash for the each track in the selected plurality of user music collections.

12. The system of claim 11, wherein the identifying the plurality of duplicate metadata candidate tracks includes selecting a set of tracks from the selected plurality of user music collections in which each track in the set of tracks has a score equal to or greater than a selected level.

13. The system of claim 9, wherein the identifying the plurality of duplicate audio candidate tracks includes calculating an audio fingerprint for each track in the selected plurality of user music collections.

14. The system of claim 13, further comprising program instructions for:

selecting an audio fingerprint corresponding to a track in the selected plurality of user music collections; and comparing the selected audio fingerprint to a corresponding audio fingerprint for the each track in the selected plurality of user music collections.

15. The system of claim 9, wherein the selecting the track in the selected plurality of user music collections includes selecting a plurality of tracks.

* * * * *